Dec. 14, 1926.

C. J. HOVASSE

SUPPORT FOR VEHICLES

Filed Dec. 30, 1922

1,611,035

Inventor
Charles J. Hovasse
by Roberts, Roberts & Cushman
Attorneys

Patented Dec. 14, 1926.

1,611,035

UNITED STATES PATENT OFFICE.

CHARLES J. HOVASSE, OF CHELSEA, MASSACHUSETTS, ASSIGNOR TO THE A. L. SMITH IRON WORKS, OF CHELSEA, MASSACHUSETTS, A CORPORATION OF MASSACHUSETTS.

SUPPORT FOR VEHICLES.

Application filed December 30, 1922. Serial No. 610,068.

This invention pertains to supports and relates more specifically to folding tripods for use in holding a vehicle, as for example an automobile, in elevated position when not in service, so as to relieve the wheels of its weight.

When automobiles are put in storage for any length of time it is customary to jack them up and to pile blocks beneath the axles to support the weight of the vehicle and relieve the pneumatic tires of unnecessary strain. As proper blocks are not always readily available, the blocking up of the vehicle is often neglected and even when blocks are actually employed they are frequently so carelessly placed as to form an insecure or uneven support for the weight of the vehicle, resulting in racking or straining its frame and actually causing more damage than were they dispensed with.

The principal object of the present invention is to provide a rigid support for use in holding a vehicle in elevated position without substantial danger of falling or of straining or racking its frame and which when not in use may be folded into small compass for storage.

Further objects are to provide a support having the above characteristics which may be manufactured cheaply from standard material, which is strong enough to support any weight which may be imposed thereon by usual types of vehicle, and which is durable, compact, simple in construction, and light in weight.

In the accompanying drawings a preferred embodiment of the invention is illustrated by way of example, and in such drawings.

Figure 1:
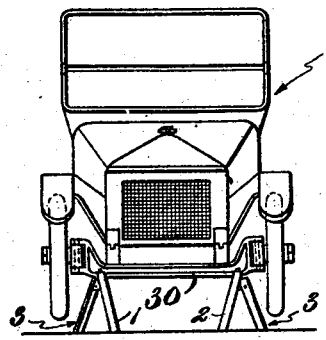
Fig. 1 is a diagrammatic front elevation of a motor vehicle shown as supported in elevated position by the use of supports embodying the present invention.
Figure 2:
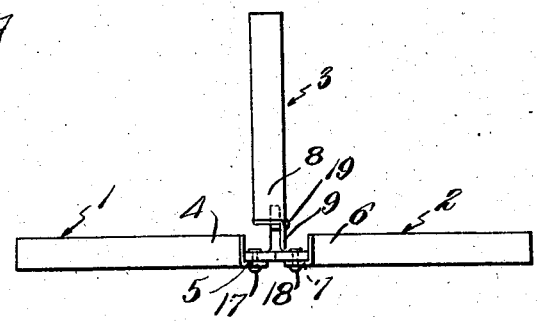
Fig. 2 is a plan view of such a support.

The support forming the subject-matter of the present invention comprises three legs 1, 2, 3 respectively. These legs are preferably formed from angle iron and comprise the flanges 4, 5; 6, 7; 8, 9 respectively. Ordinarily the two flanges of each leg will be of equal width and arranged at right angles to each other. A connector device for holding the several legs in operative relation is indicated at 10. This connector device is preferably formed from a length of T iron, whose cross member comprises the flanges 11, 12 lying in the same substantially vertical plane and which has the intersecting member or flange 13, the three flanges intersecting along a substantially vertical line. The flanges 11, 12 are provided with openings 14, 15 respectively while the flange 13 is provided with an opening 16. Rivets 17, 18 pass through the openings 14, 15 respectively, and serve as pivots for the legs 1, 2, the rivets passing through openings in the flanges 5 and 7 of the respective legs. A rivet 19 serves pivotally to connect the flange 9 of the leg 3 with the flange 13 of the connector, such rivet passing through the opening 16 in the latter.

The upper edges of the flanges 11, 12 constituting the cross piece of the connector are inclined inwardly as indicated at 20, 21 respectively, thus providing a V notch which serves as the supporting and positioning element for the axle of the vehicle when mounted upon the support. Preferably the upper edge 22 of the flange 13 is cut off in a plane slightly below the bottom of the V notch in the cross piece so as not to interfere with the axle of the vehicle. The outer edge of the flange 13 is inclined downwardly as shown at 23, while the outer edges 24, 25 of the flanges 11, 12 respectively are substantially straight and parallel.

Figure 4:
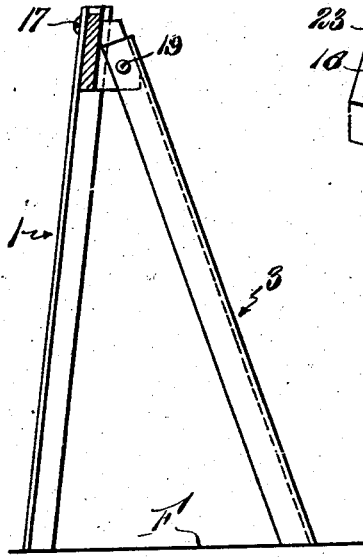
Fig. 4 is a vertical cross section on the line 4—4 of Fig. 3.
Figure 5:
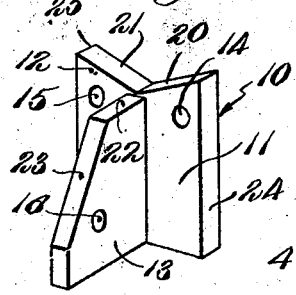
Fig. 5 is a perspective view to larger scale illustrating a connector device employed in the construction of the support.
Figure 3:
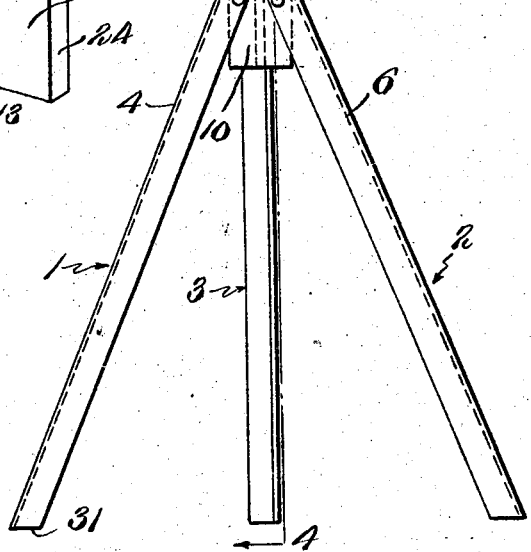
Fig. 3 is a front elevation of the support of Fig. 2.

The legs 1, 2 of the device are of substantially equal length, but it is preferred to make the leg 3 somewhat shorter than the other legs so that when the device is placed upon the floor or other support as indicated at F, Fig. 4, the plane of the legs 1, 2 inclines backwardly to some extent so that the axle supporting element of the connector lies vertically above a point within the periphery of the figure defined by the lower ends of the several legs. With this arrangement the weight of the vehicle is supported in a stable manner so that a very considerable side-thrust would be necessary to tip the support sufficiently to permit the vehicle to drop. Preferably the lower ends of the legs are bevelled off as indicated at 31 for example in order that such ends may make firm contact with the floor.

When the device is in use the several flanges of the connector lie in substantially vertical planes and the upper portions of the flanges 4, 6 respectively of the legs 1 and 2 engage the outer edges 24, 25 of the connector device and limit outward swinging of these legs. In the same way the flange 8 of the leg 3 engages the inclined outer edge 23 of the flange 13 of the connector so that outward movement of the leg 3 is likewise limited. By providing the inclined edge 23, a long contact bearing is furnished so that the leg 3, which may be considered as a brace, is very firmly retained in position. If it were deemed desirable, it is evident that the outer edges of the flanges 11, 12 might likewise be bevelled so as to provide a longer contact surface for engagement with the flanges 4, 6 of the legs 1 and 2.

When it is desired to support a vehicle A, as shown in Fig. 1, in elevated position four of the tripod supports herein disclosed are provided and after the vehicle has been jacked up, two of such supports are arranged beneath each axle, such as the axle 30, and the vehicle is lowered slightly until its weight is carried by the several supports. The V notches assist in properly positioning the supports relatively to the axles, and also to prevent slipping of the axles from the support, while as above noted the rearward inclination of the plane of the legs 1, 2 when in use adds greatly to the stability of the vehicle when supported thereon. When the device is not in use it is manifest that the legs may be folded into parallelism with each other, thus occupying comparatively small space. The device is relatively light in weight while exceedingly strong, and as all of its parts may be manufactured from standard material, and without any expensive machine operations, the cost of manufacture is small.

What I claim and desire to secure by Letters Patent of the United States is:

1. A tripod support for vehicles comprising a T-shaped connector and three legs, each leg being formed from angle iron and having one of its flanges pivotally secured to a side face of a corresponding flange of the connector, the other flange of each leg engaging the edge of the corresponding flange of the connector for limiting outward swinging movement of the respective leg.

2. A tripod support for vehicles having three legs and a connector, said connector consisting of a length of T iron disposed with its cross member in a substantially vertical plane, said cross member having a depression in its upper edge, and means for securing two of the legs to the aligned flanges constituting the cross member, and the third leg to the intersecting member of the T iron, respectively.

3. A tripod support for vehicles comprising a connector having two flanges lying in the same vertical plane and a third vertically disposed flange arranged at right angles to said plane, said latter flange having a downwardly inclined edge, and a leg secured to each flange of the connector, each leg being provided with a flange engageable with the edge of the corresponding flange of the connector for limiting movement of the respective leg.

4. A tripod support for vehicles comprising a connector and three legs, said connector consisting of a length of T iron disposed with all of its flanges in substantially vertical planes, and means for pivotally securing one of the legs to each of said flanges, one of said flanges having an inclined edge portion for engagement with an element of the corresponding leg to determine the normal operative position of the latter.

5. A tripod support for vehicles comprising three legs formed from angle iron and a connector device formed from T iron, said connector device having all its flanges disposed in substantially vertical planes, the outer edges of the cross member of said connector being substantially straight and parallel and the outer edge of the intersecting member of the connector being downwardly inclined, and means for pivotally connecting a flange of two of the legs respectively to the cross member of the connector and a flange of the other leg to the intersecting member thereof, the other flanges of the respective legs bearing against the corresponding outer edges of the connector to limit movement of the legs.

Signed by me at Boston, Mass., this 29th day of December 1922.

CHARLES J. HOVASSE.